US008917783B2

(12) United States Patent
Aryanfar et al.

(10) Patent No.: US 8,917,783 B2
(45) Date of Patent: Dec. 23, 2014

(54) RESONANCE MITIGATION FOR HIGH-SPEED SIGNALING

(75) Inventors: Farshid Aryanfar, Sunnyvale, CA (US); Aliazam Abbasfar, Sunnyvale, CA (US); Amir Amirkhany, Sunnyvale, CA (US)

(73) Assignee: Rambus Inc., Sunnyvale, CA (US)

( * ) Notice: Subject to any disclaimer, the term of this patent is extended or adjusted under 35 U.S.C. 154(b) by 632 days.

(21) Appl. No.: 13/129,998

(22) PCT Filed: Dec. 3, 2009

(86) PCT No.: PCT/US2009/066656
§ 371 (c)(1),
(2), (4) Date: May 18, 2011

(87) PCT Pub. No.: WO2010/065789
PCT Pub. Date: Jun. 10, 2010

(65) Prior Publication Data
US 2011/0228864 A1    Sep. 22, 2011

Related U.S. Application Data

(60) Provisional application No. 61/119,506, filed on Dec. 3, 2008.

(51) Int. Cl.
*H04L 27/00* (2006.01)
*H04L 25/02* (2006.01)
*H04L 25/03* (2006.01)

(52) U.S. Cl.
CPC ...... *H04L 25/0272* (2013.01); *H04L 25/03878* (2013.01)
USPC .......................................... 375/259; 375/257

(58) Field of Classification Search
CPC .................................................. H04L 25/0272
USPC .................................................. 375/259, 257
See application file for complete search history.

(56) References Cited

U.S. PATENT DOCUMENTS

| | | | |
|---|---|---|---|
| 6,522,699 B1 * | 2/2003 | Anderson et al. | 375/295 |
| 2001/0050987 A1 | 12/2001 | Yeap et al. | 379/399.01 |
| 2004/0176058 A1 | 9/2004 | Johnson | 455/147 |
| 2005/0104619 A1 | 5/2005 | Best et al. | 326/30 |
| 2006/0245485 A1 | 11/2006 | Martin et al. | 375/229 |
| 2007/0268407 A1 | 11/2007 | Rea et al. | 348/572 |
| 2010/0020893 A1 * | 1/2010 | Hoshino et al. | 375/267 |
| 2011/0033007 A1 * | 2/2011 | Zerbe et al. | 375/295 |

OTHER PUBLICATIONS

International Search Report and the Written Opinion with mail date of Jun. 28, 2010 re Int'l Application No. PCT/US2009/066656. 12 Pages.
PCT International Search Report (Chapter 1) dated Jun. 16, 2011 re Int'l Application No. PCT/US2009/066656. 6 Pages.

* cited by examiner

*Primary Examiner* — Michael Neff
(74) *Attorney, Agent, or Firm* — Lance Kriesman; Peninsula Patent Group

(57) ABSTRACT

The frequency response of a first component signal path of a differential signaling link is adjusted to off-set a notch in the frequency response from a corresponding notch in the frequency response of a second component signal path of the differential signaling link.

42 Claims, 9 Drawing Sheets (Prior-Art)

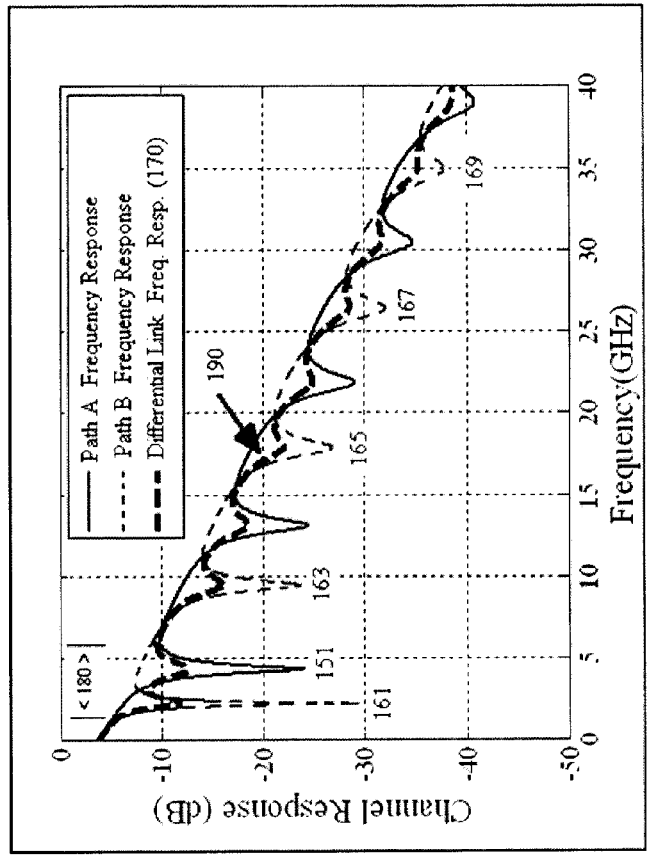
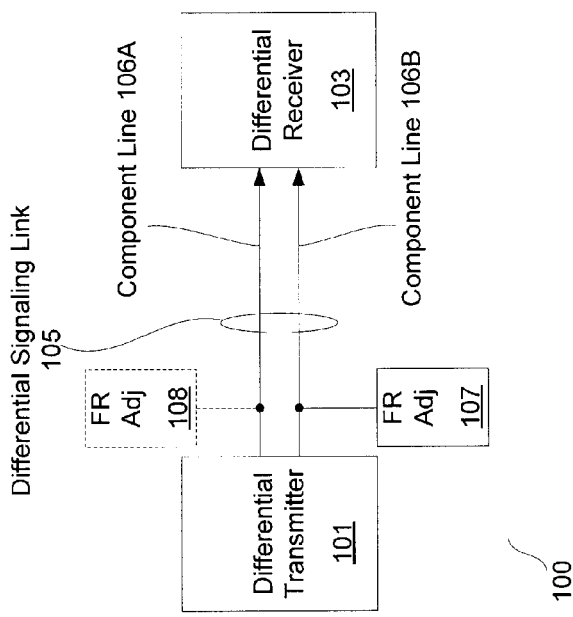
Figure 2B
Figure 2A

US 8,917,783 B2

RESONANCE MITIGATION FOR HIGH-SPEED SIGNALING

CROSS-REFERENCE TO RELATED APPLICATIONS/TECHNICAL FIELD

Pursuant to 35 U.S.C. § 365, this application claims priority from International Application No. PCT/US2009/066656, published as WO 2010/065789 A2 on Jun. 10, 2010, which claims priority from U.S. Provisional Application No. 61/119,506, filed Dec. 3, 2008 and entitled "Asymmetric Differential Signaling". International Application No. PCT/US2009/066656 and U.S. Provisional Application No. 61/119,506 are hereby incorporated by reference in their entirety.

The disclosure herein relates to the field of high-speed electrical signaling.

BACKGROUND

In a differential signaling system, the two component signal lines of a differential signaling link carry complementary (i.e., equal magnitude, opposite polarity) signals that are compared with one another at precisely controlled sampling instants in the receiving device to generate digital samples of the transmitted signal. In general, such differential signaling provides increased voltage margin in the sampling operation (and thus greater sampling reliability) relative to single-ended signaling due to increased noise immunity and because the conveyed data value is determined by comparing a signal against its complement (i.e., comparing two opposite-polarity signals at an instant that nominally corresponds to the peak of their swing) instead of a threshold set at the signal-swing midpoint. In terms of noise immunity, the component signaling lines of a differential link tend to be disposed proximally enough to be affected equally by noise sources, thus rendering the differential potential between the two lines impervious to such "common mode" noise.

Set against the advantages of differential signaling is the additional cost of the doubled number of signaling lines and integrated-circuit (IC) input/output (I/O) nodes needed to convey two signals per transmitted symbol. Also, as the demand for increased signaling bandwidth pushes signaling rates deeper into the gigahertz range, timing and voltage margins are shrinking to the point where increasingly precise and more costly signal routing, both in-package and over printed circuit board traces, is required to match the channel characteristics of the component signal paths of each differential link and thereby equalize the signal propagation times and electrical characteristics of the complementary signals. Further, practical signaling paths, both differential and single-ended, generally exhibit band-limiting notches (frequency intervals of reduced signal-to-noise ratio (SNR) at frequencies that correspond to reflections and other sources of systematic interference) due to impedance discontinuities, intersymbol-interference (ISI) and other frequency-dependent sources of signal attenuation. For example, FIG. 1 illustrates the frequency response of a differential signaling link that exhibits band-limiting notches 50-55. Thus, despite the higher voltage margin in a differential signaling link relative to a single-ended link, the differential signaling link still tends to be band-limited at the frequency of the first dominant notch (e.g., notch 50 in FIG. 1).

BRIEF DESCRIPTION OF THE DRAWINGS

The present invention is illustrated by way of example, and not by way of limitation, in the figures of the accompanying drawings and in which like reference numerals refer to similar elements and in which:

FIGS. 2A and 2B illustrate an embodiment of an asymmetric differential signaling link and corresponding frequency response, including frequency responses of component signal paths of the asymmetric differential signaling link;

DETAILED DESCRIPTION

I. Overview

Figure 1:
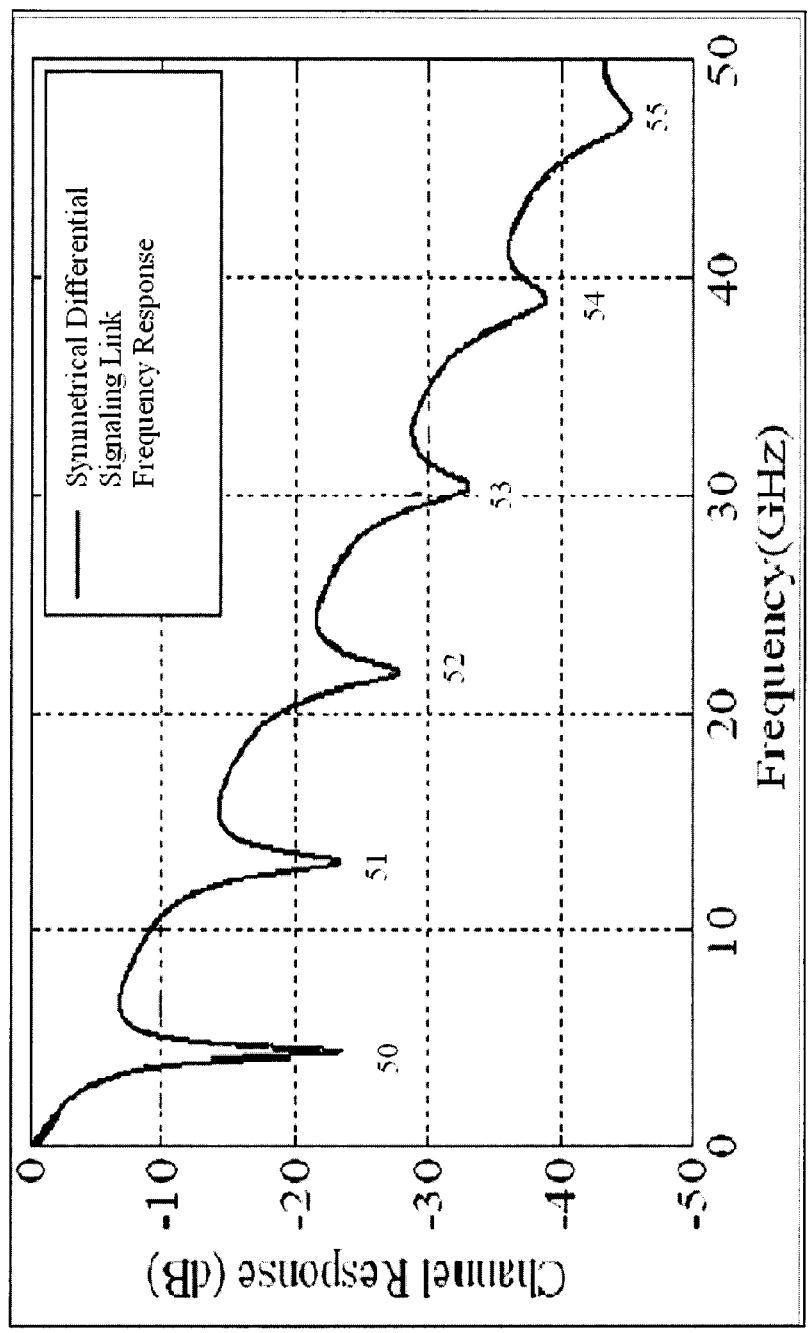
FIG. 1 illustrates the frequency response of a prior-art differential signaling link.

Differential signaling systems having signaling rates that extend beyond the frequency of the first dominant notch are disclosed in various embodiments herein. In a general embodiment, the frequency responses of the component signal paths of a differential signaling link are offset (or displaced, shifted or otherwise adjusted) relative to one another such that the spectral positions of the first dominant notch (i.e., the lowest frequency notch that may otherwise represent a band-limiting notch as to the baseband signaling rate) are misaligned as to the component signals. By this arrangement, the net signal attenuation in the differential signaling link may be spread across a wider notch (i.e., wider frequency interval which may span a widened combination of the component-path notches or even two distinct component-path notches), but reduced relative to the conventional, matched-pair approach. This mitigates an otherwise resonant notch condition. In terms of the time-domain, and focusing on attenuation due to reflection-type ISI, a notch may be viewed as a frequency range over which reflections on both lines of the differential pair tend to overcome (i.e., drown out) the signal of interest. By misaligning the frequency responses in the component paths of the differential link, the frequencies at which signal-to-noise ratio drops (i.e., notches or drown-out spots) occur at a different transmission frequency for each component path. Consequently, in a system designed and implemented in accordance with the teachings herein, even if notch attenuation may otherwise be so substantial as to render a signal undetectable in a conventional differential signaling link, the notch displacement will enable the signal to be passed on one or the other of the component paths and thereby detected in spite of its severely attenuated (drowned-out) state on the counterpart path. For example, considering the voltage differential on the signaling link, even if one of the signals is attenuated to near-common mode, the preservation of sufficient signal amplitude on the counterpart link will enable signal detection through comparison of the un-attenuated and attenuated signals. From a spectral standpoint, data patterns yielding frequencies that are attenuated by the notch in a first component signal path may be passed without substantial attenuation in the second component signal path (due to the notch displacement between the two component signal paths) and vice-versa. By displacing the component-path notches sufficiently to reduce signal attenuation to a level that permits data recovery through the now-dispersed notch frequency range, baseband signaling at rates that extend through and above the notch frequency range become possible. In effect, the bandwidth limitation represented by the first dominant notch may be lifted, enabling substantially higher baseband signaling rates.

Various techniques and circuitry are also disclosed for determining and effecting the notch displacement appropriate to reduce the net signal attenuation in the differential signaling link. In one embodiment, for example, signal integrity modeling techniques are utilized in the design and/or manufacturing phases of an electronic component to determine and effect the notch displacement appropriate to reduce the net signal attenuation in the differential signaling link.

As discussed in detail below, displacement of the notches in individual signaling lines (referred to herein as the "component lines" or "component paths") of a differential signaling link may be achieved using various different techniques and combinations of such techniques including, without limitation, providing dedicated or run-time (or one-time) programmable circuitry to effect the notch displacement, effecting notch displacement by adjusting electrical characteristics of one of the component signal paths relative to the other, either on-die, in-package, in the traces or wires between integrated circuit dice (or packages) or any combination thereof. In the sections below, a generalized implementation of an asymmetric (i.e., notch-displaced) differential signaling system is described, followed by a description of various techniques and circuit arrangements that may be used to effect notch displacement, as well as various approaches for determining the specific frequency-response adjustments that may be deployed to optimize or improve signaling margins (and potentially increase the maximum attainable signaling rate) within a given signaling system.

The disclosure herein also presents resonance mitigation techniques applied to single-ended multi-drop signaling systems. In one embodiment, for example, coupled transmission lines are employed to prevent destructive signal resonance caused by signal reflection from capacitive loads and mismatches in the channel.

II. Offset Notch Frequencies in a Differential Signaling Link

FIG. 2A illustrates a generalized embodiment of an asymmetric differential signaling system 100 formed by a differential transmitter 101, differential receiver 103, and asymmetric differential signaling link 105. As shown, the asymmetric differential signaling link includes component signal lines 106A and 106B, as well as frequency-response adjustment element 107 (and, optionally, frequency-response adjustment element 108).

The differential transmitter and receiver may be disposed on respective integrated circuit (IC) devices that are interconnected via conductive traces, cables or other electrical or optical signaling media which form the differential signaling link 105. The IC devices may themselves be respective IC dice that are disposed, for example, within respective IC packages and secured permanently or removably to a printed circuit board. Alternatively, the IC dice may be disposed within a common IC package, and the differential signaling link 105 formed by wire-bond or other conductive connections between the commonly packaged dice. In other embodiments, the differential transmitter and receiver may be implemented within a single IC die and the differential signaling link 105 formed by one or more conductive layers (e.g., metal and/or polysilicon conductive layers).

Although a single differential transmitter and differential receiver are depicted, those circuit elements may be part of a larger system that includes numerous such receivers and transmitters. Also, while differential signaling link 105 is depicted as a unidirectional path (i.e., signals propagating thereon from differential transmitter 101 to differential receiver 103), the differential signaling link may additionally be coupled to counterpart differential transmitter/receiver components to enable signaling in the opposite direction.

With regard to the asymmetric differential signaling link itself, the link may be formed by numerous constituent segments that are not specifically shown and which may include, without limitation, an on-chip segment extending from an output driver (transmitter) circuit or receiver circuit (receiver) to an input/output (I/O) node (e.g., pin, contact, lead or inductive/capacitive interconnect) of an IC die; one or more intra-package segment(s) (e.g., traces, vias, etc. for routing from die to package-to-board contact); one or more traces disposed on respective printed circuit board layers and interconnected by vias or other layer interconnect structures; one or more connectors between circuit boards themselves (e.g., as in the case of an IC on a motherboard communicating with an IC on a daughterboard, or two line cards inserted into backplane connectors).

The frequency-response adjustment element 107 (the "adjustment element" or "response displacement element" and which may optionally include an element 108 coupled to line 106A) may be implemented in a variety of ways as discussed below, but generally performs the function of establishing an offset between the center frequencies of the notches of the component signaling line. This function is illustrated in FIG. 2B, which depicts the frequency response of the asymmetrical differential signaling link 105 according to the generalized embodiment of FIG. 2A. As used herein, "asymmetrical differential signaling link" refers to a differential signaling link in which the frequency responses of the component signal paths are intentionally offset (i.e., by frequency-response adjustment element(s) 107 and/or 108) to avoid band-limiting overlap between their respective notches. More specifically, FIG. 2B illustrates that the center frequencies of the first dominant notches 151 and 161 in component signaling lines 106A and 106B, respectively have been offset from one another to an extent sufficient to avoid substantial overlap and thus yield a net frequency response 170 of the asymmetrical differential signaling link in which the first dominant notch is spread across a wider frequency interval 180 that yields substantially less signal attenuation than when frequency-aligned. That is, the net attenuation interval, referred to herein as a frequency-dispersed notch (and which may include two distinguishable notches) is wider and shallower than in the symmetrical differential link discussed in the background above (i.e., a differential signaling link where the frequency responses for each of the component signal paths of the differential signaling link are intentionally matched). Consequently, reliable signaling may be carried out in frequencies that extend into and above the range of the frequency-dispersed notch, thereby enabling the baseband signaling rate to be extended at least beyond the first dominant notch, and possibly beyond higher frequency notches.

Referring to FIG. 2B, for example, in addition to offsetting the first dominant notch 161 of component signal path B, similar offsets have been effected in each of the four higher-frequency notches 163, 165, 167, 169 of component signal path B. Thus, the higher-frequency notches are also frequency-dispersed and mitigated relative to their counterparts in a symmetrical differential link. In terms of the specific frequency range shown, and supposing that the minimum tolerable channel response is, for example, −20 dB, the maximum baseband signaling rate would be raised from approximately 4 GHz for a conventional symmetrical differential signaling link (i.e., where the first dominant notch represented by 151 first crosses the −20 dB line), to approximately 17 GHz for the asymmetrical differential signaling link as shown at 190.

III. Adjusting the Frequency Response

Numerous techniques may be employed, individually or in combination, to adjust the frequency response of one or both component signaling paths in a differential signaling link. Conceptually, the various techniques may be separated into off-chip and on-chip adjustments. Off-chip adjustments include, without limitation, design-time adjustments to the stub-interconnections to and/or impedance of one or both conductive paths coupled between IC packages (although switches or other circuitry to support run-time or production-time off-chip adjustments may also be provided), while on-chip adjustments involve on-die or at least intra-package circuitry to enable run-time or production-time adjustment of stub interconnections to and/or impedance of on-die (or intra-package) segments of a signaling path.

A. Off-Chip Adjustment

Figure 3:
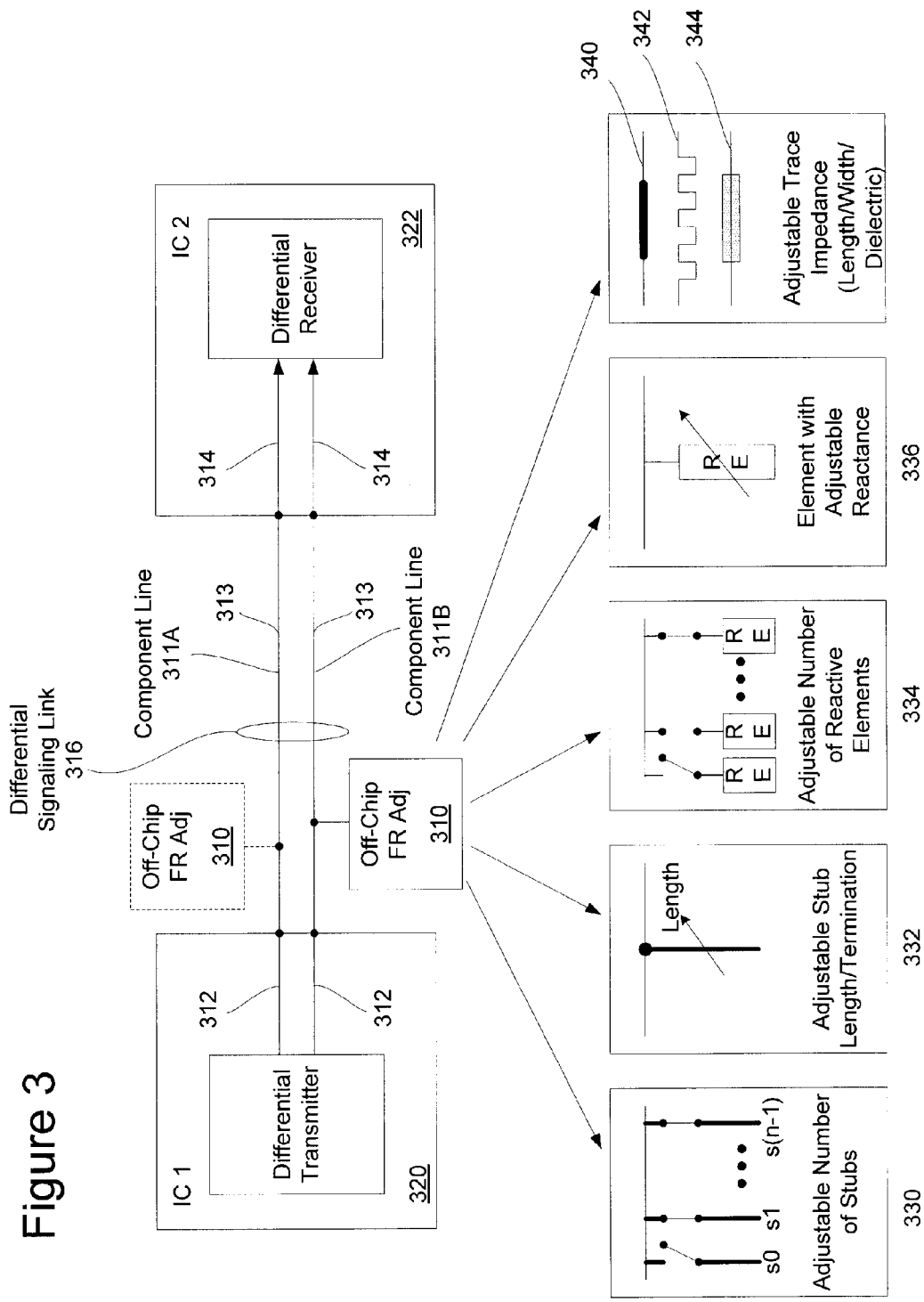
FIG. 3 illustrates an embodiment of a signaling system that employs one or more off-chip frequency-response adjustment elements to achieve a desired spectral offset between notches on the component paths and of an asymmetric differential signaling link.

FIG. 3 illustrates an embodiment of a signaling system that employs one or more off-chip frequency-response adjustment elements (310) to achieve a desired spectral offset between notches on the component paths 311A and 311B of an asymmetric differential signaling link 316. As shown, the differential signaling link 316 is coupled between IC dice 320 and 322, and more specifically between a differential transmitter on IC die 320 and a differential receiver on IC die 322. As in the more generalized embodiment of FIG. 2A, multiple instances of differential signaling link 316 may be coupled between the IC dice, each or any one of which may be driven bi-directionally instead of uni-directionally as shown.

Still referring to FIG. 3, each of the component signaling paths, 311A and 311B, is segmented into on-chip segments 312 and 314, and off-chip segment 313, with the off-chip frequency-response adjustment elements (the "adjustment elements") coupled to or formed integrally with the off-chip segments. In one embodiment, for example, the adjustment elements are formed by one or more stubs as shown at 330 and which may be permanently or switchably coupled (via switches) to the off-chip segment 313 of either or both component signaling paths and thus provide a source of reflections that may be used to tune the frequency response of the component signaling path as necessary to provide a desired shift in the component frequency response. The stubs may all be the same-length or may have different lengths; they may be dispersed at different connection points with respect to the component signal line; and they may be un-terminated, terminated by a fixed load, or terminated by a variable load. These aspects provide control with respect to the latency and amplitude of the resulting reflections and more generally, provide different degrees of freedom with which to adjust the frequency response of the component signaling path. As shown, the adjustment element or elements or any one of them may alternatively be implemented by an adjustable-length stub 332 effected, for example, by active elements, discrete reactive components, or stub segments coupled in series via switch elements (e.g., all switches closed to effect a maximum length stub, and all open to effect a minimum stub length). In one embodiment, for example, vias between conductive layers on a printed circuit board may be incompletely back-drilled (ordinarily being back-drilled so as to leave conductive material extending only between the printed circuit board layers) to leave a desired length of via-stub. As with the adjustable number of stubs, the adjustable-length stub may be un-terminated, coupled to a fixed termination load or to an adjustable termination load. Continuing, the adjustment element or any one of them may be implemented by one or more reactive elements (which may have equal or differently weighted reactive values) that are permanently or switchably coupled to the component signaling line (and which may be coupled between the signaling path and ground or other reference voltage node) as shown at 334. As with the stub arrangement, the reactive elements or any one of them may also be implemented by an adjustable reactive element (e.g., having a switch-selectable or signal-controlled capacitance or inductance), as shown at 336. Yet other embodiments may include adjustments to trace width (340), trace length (342), and/or dielectric constant of adjacent substrate (344), all or any of which may effect a change in trace impedance and thus a desired frequency response adjustment (though care is necessary particularly in adjustment of trace length to avoid unduly skewing the component signals of the differential link).

In terms of practical application, the desired number/length of stubs, termination load, number/reactance of reactive elements, and/or adjustable trace geometry (or substrate dielectric-constant) may be empirically or analytically determined as part of system design and implemented, by design, as part of the signal path topology. Alternatively, the switch elements used to engage or disengage stubs or reactive elements may be implemented by production-time-severable traces (trace-cutting) or physical switches determined in response to production-time analysis on a product by product basis, or at least based on a system configuration basis (e.g., different signaling arrangement according to selected population of daughterboard sockets). In yet other embodiments, the switch elements may be implemented by signal-controlled switches (e.g., transistors) and controlled by signals from the IC's or strapped (i.e., jumpered) to selected control voltage nodes. More generally, any manner of effecting and selecting the desired frequency-response adjustment may be employed to purposely offset the frequency responses of the component signaling paths 311A and 311B of the differential signaling link

B. On-Chip Adjustment

Figure 4:
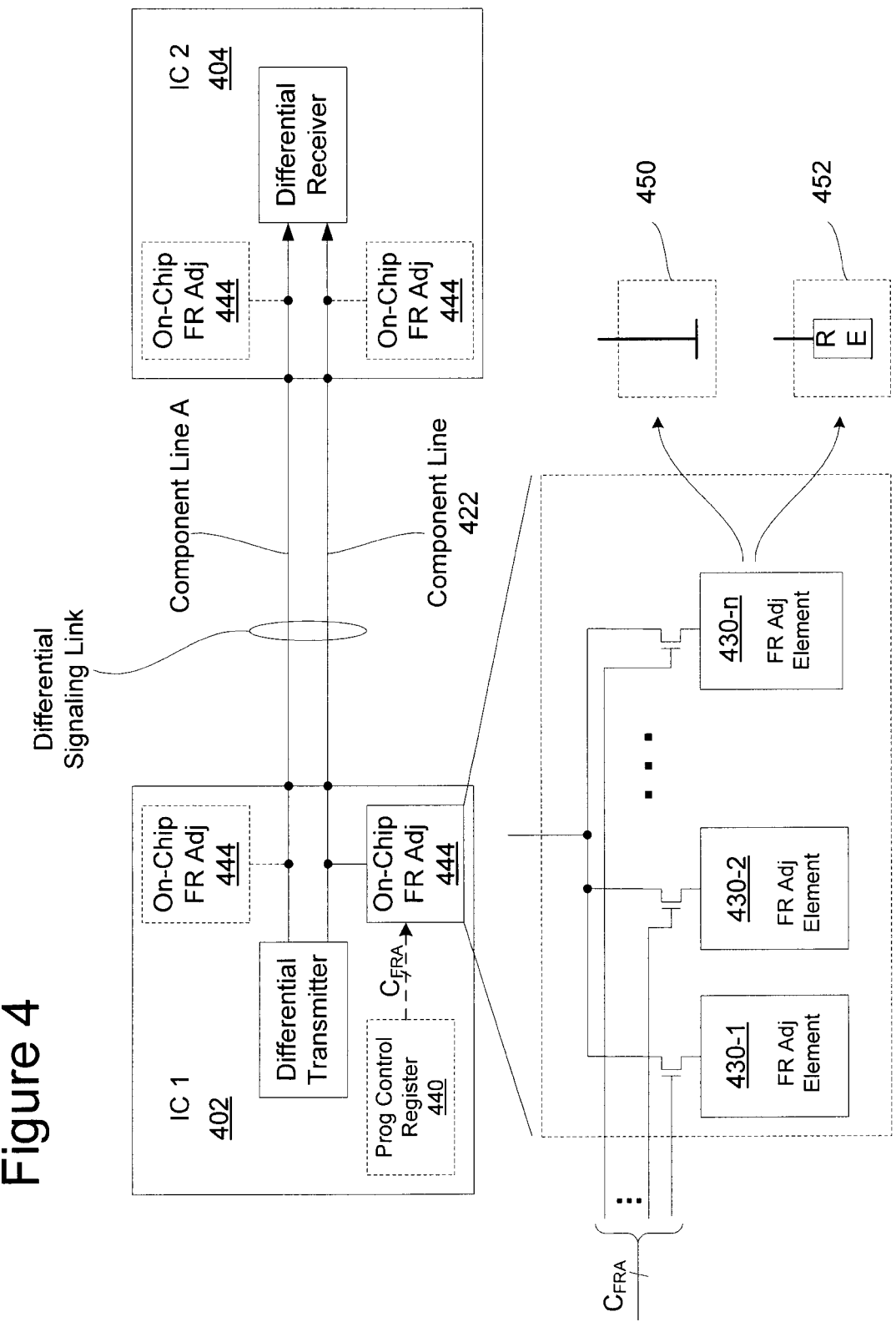
FIG. 4 illustrates an embodiment of a differential signaling system that employs on-chip frequency-response adjustment elements instead of or in addition to the off-chip adjustment elements discussed in reference to FIG. 3.

FIG. 4 illustrates an embodiment of a differential signaling system that employs on-chip frequency-response adjustment elements 444 ("adjustment elements") instead of or in addition to the off-chip adjustment elements discussed in reference to FIG. 3. From the standpoint of system design, providing on-chip (or at least in-package) adjustment elements enables a given IC die (or package) to be applied in numerous different signaling system topologies without need for case-by-case re-design of the IC. That is, the same IC may be applied with different adjustment settings to effect asymmetric frequency responses in component paths of a differential link according to the specific signaling environment (e.g., a first setting in the case of a relatively noise- and/or reflection-free environment, and a second, different setting in the case of a more noise- or reflection-plagued system). Moreover, on-chip programmable control over frequency response adjustments may be provided to enable run-time or production-time adjustment as necessary, for example, to meet empirically, analytically or calibration-determined setpoints. Alternatively, pin-strapping (selectively coupling pins of an IC die, or package or socket into which the package is removably inserted, to different voltage reference nodes) may be employed to effect production-time setting of the frequency response adjustment.

Still referring to FIG. 4, the signaling system includes a differential signaling link coupled between IC dice 402 and 404. As in the embodiment of FIG. 3, the component signaling paths of the differential link are segmented into on-chip and off-chip segments, with the on-chip segments being coupled between pads, pins or other interconnect structures of the die (or package) and the on-die circuitry (e.g., the differential transmitter in IC 402 and the differential receiver in IC 404). Also, as with embodiments discussed above, the differential signaling link may be replicated to effect multi-bit paths between the ICs 402 and 404, and may be driven in the opposite direction between counterpart differential receiver and differential transmitter circuits within IC dice 402 and 404, respectively.

As shown, the frequency-response adjustment element (or elements) may be coupled to a single component path 422 within only one of the IC dice 402 and 404, or to both component paths within one or both of the IC dice (as indicated by the additional adjustment elements 444 shown in dashed outline). The frequency-response adjustment element may be implemented, for example, by multiple component adjustment elements 430-1-430-n that are switchably coupled to a component signaling path in response to a control signal, CFRA. As discussed above, the control signal may be generated by an optional programmable register 440 (itself run-time programmable in response to a programming instruction/command or one-time programmable through fuse-blowing, non-volatile cell programming or other technique for establishing a non-volatile configuration setting) or by pin strapping or any other manner of generating a desired control signal. In the particular embodiment shown, the control signal, CFRA, is a fully-decoded multi-bit signal, the constituent bits of which are applied to the gates of switching transistors (or pass-gates or other signal-controlled switching elements) to selectively couple corresponding component adjustment elements to the output node of the overall (composite) frequency-response adjustment element. The control signal may alternatively be an encoded value that is decoded within the on-chip frequency adjustment element 444 or applied directly to weighted adjustment components.

As with off-chip embodiments discussed above, the component frequency response adjustment elements may be implemented by any structure or element capable of affecting the frequency response of the component signaling path including, without limitation, terminated and/or un-terminated stubs (450), reactive elements (452) or any combination thereof. Also, the component frequency-response adjustment elements or any subset thereof may be integrated within an output driver circuit (and/or sampling circuit) and thus perform dual functions. For example, current sinking or current-sourcing transistors within an output driver may be selectively coupled to the signaling path during signal transmission and/or reception intervals to effect a desired frequency-response adjustment of a component signaling line. Regardless of whether implemented as standalone elements or integrated within other circuits of the IC (including circuits which enable such elements to perform dual functions), the component frequency-response adjustment elements may be weighted (e.g., binary weighted) to enable a broad range of frequency-response adjustments, and/or individual component frequency-response elements may themselves be adjustable (in terms of their stub length, termination load, reactive property, etc.) in response to a programmed or predetermined control signal.

IV. Determining and Implementing Appropriate Notch-Adjustment

Figure 5:
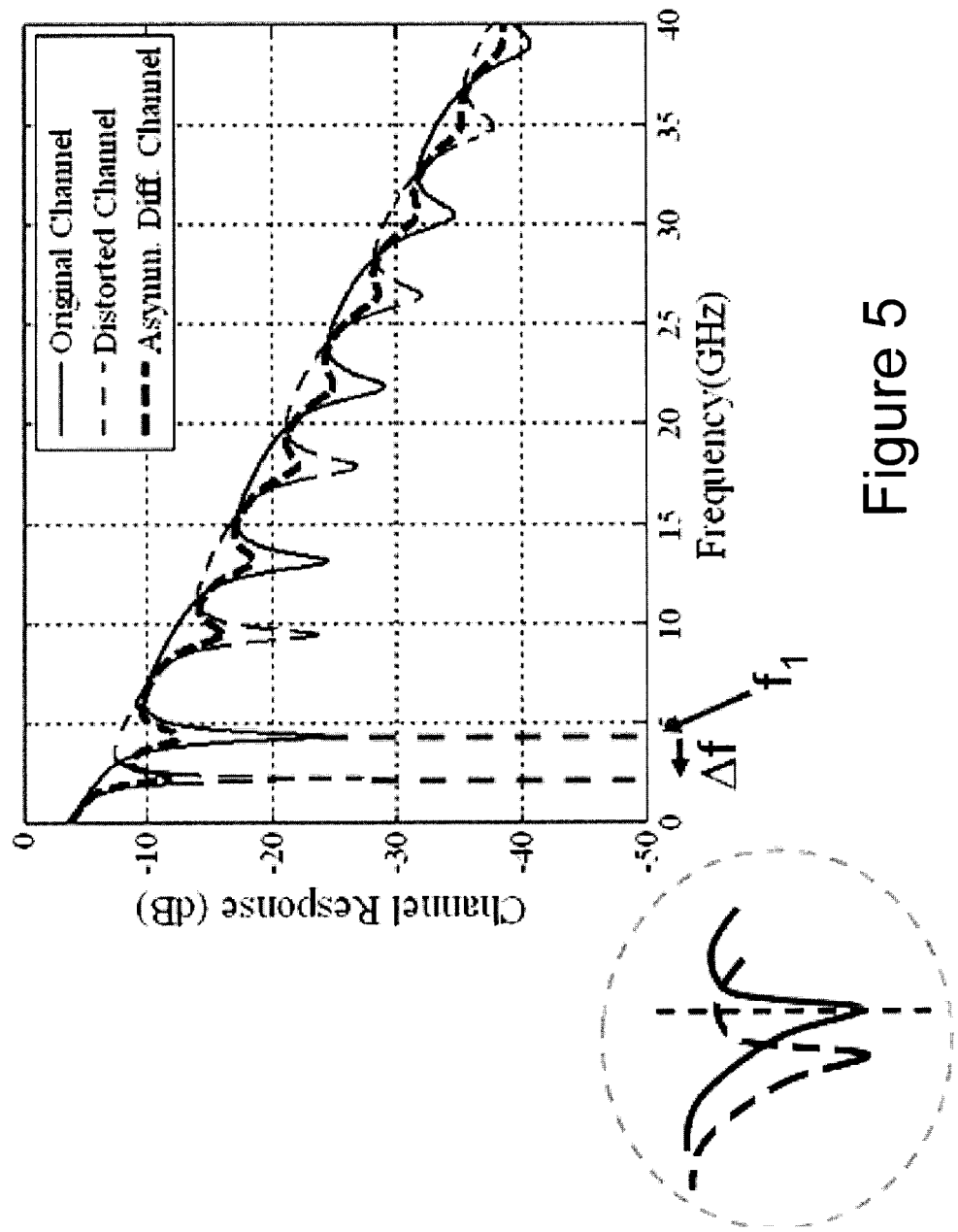
FIG. 5 illustrates an exemplary waveform of an asymmetric differential signaling system, emphasizing an offset between nulls in component signaling paths of a differential link.

As briefly discussed above, the desired frequency-response adjustment in a differential signaling link may be determined during design-phase through empirical observation and/or analytical modeling or during run-time or production-time using empirical, analytical or in-system calibration. Referring to FIG. 5, it can be seen that the theoretically optimum frequency-response adjustment occurs when the first null (i.e., lowest frequency null) in the frequency-adjusted path (shown in the diagram as the distorted channel) coincides with a local peak in the counterpart path (the original channel) or vice-versa, thus yielding a resultant asymmetric differential channel that enables passage of a peak-level signal over one of the component paths when the signal-to-noise ratio is at a minimum in the other path. More generally, any frequency-response adjustment that yields increased signaling performance (whether such performance increase be ascertained analytically, empirically or through run-time or production time measurement) may be applied within the asymmetric differential signaling link. Thus, in one embodiment, alignment of the local peak (i.e., frequency of minimum signal attenuation) in one signaling component and the local minimum (i.e., frequency of maximum signal attenuation) in another signaling component constitutes the target adjustment, while others may include, without limitation: aligning the notches so that the minimum in the notch of one signaling component occurs at a frequency below the cut-off frequency (the frequency at which the signal is attenuated by −3 db of the peak signal) of the notch of another signaling component; aligning the notches such that the cut-off frequency at the low-frequency-side of the notch of one signaling component is greater than the cut-off-frequency at the high-frequency-side of the notch of another signaling component; aligning the notches so that the minimum in the notch of one signaling component occurs at a frequency below the receiver sensitivity parameter of the notch of another signaling component; aligning the notches such that the receiver sensitivity parameter at the low-frequency-side of the notch of one signaling component is greater than the receiver sensitivity parameter at the high-frequency-side of the notch of another signaling component; aligning the notches such that the first or primary notch in one signaling component is shifted not more than the frequency displacement between the first (primary) and secondary notches in that signaling component (otherwise, the second, higher frequency notch may overlap the first notch in the other signaling component); or aligning the notches such that the first notch in one signaling component is shifted by (or not more than) 50% of the frequency displacement between the first (primary) and secondary notches in that signaling component, thus offsetting the notches in the two signaling components by half the spectral difference between the primary and secondary notches.

In general, the frequency displacement (Δf) required to reach the theoretical optimum will vary depending on numerous factors including, without limitation, the width, depth and period (i.e., spectral spacing between adjacent notches on a component signaling path) of the notches.

Figure 6:
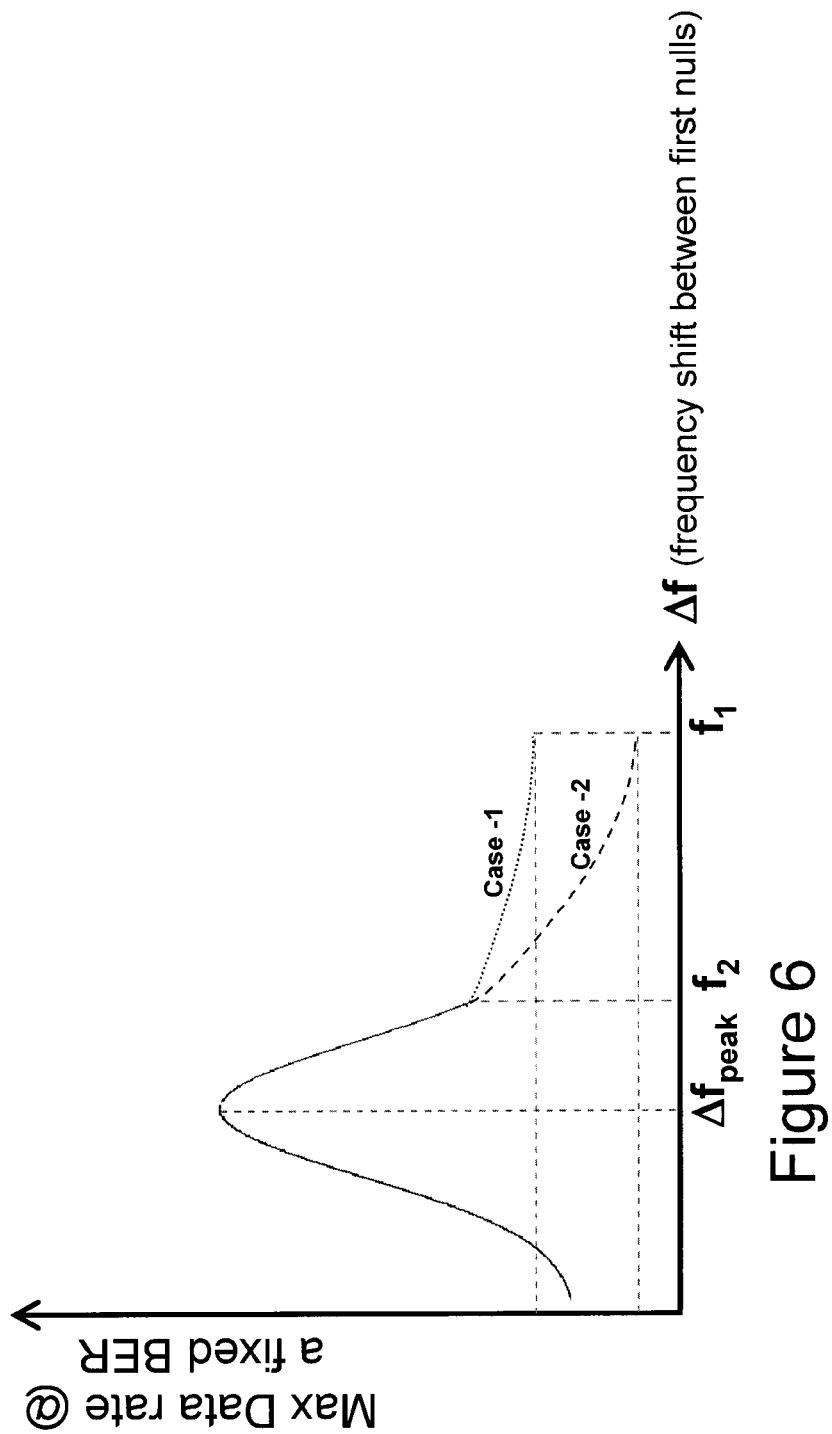
FIG. 6 illustrates a plot of maximum achievable data rate for a given bit error rate as the frequency shift between the first (dominant) nulls in the component paths of a differential signaling link is extended from zero through a range of offset frequencies, ending at frequency, f1.

FIG. 6 illustrates a plot of maximum achievable data rate for a given bit error rate (i.e., fixed BER) as the frequency shift between the first (dominant) nulls in the component paths of a differential signaling link is extended from zero through a range of offset frequencies, ending at frequency, f1. As shown, a Gaussian distribution is achieved, with a peak data rate being achieved at the theoretically ideal frequency shift, Δf, and with declining data rate as the frequency is shifted beyond that point. Two different cases are illustrated, according to the width of the nulls and their spacing relative to other nulls on the same component path (i.e., period of the nulls). That is, in case 1, the nulls have a narrow width and are spaced such that, even after a shift of f1, a second null of the shifted path does not overlap with the first null of the counterpart component path. In the second case, wider more closely spaced nulls result in overlap between a second null of the shifted path and the dominant (first null) of the counterpart path as the frequency shift extends beyond f2.

Reflecting on FIGS. 5 and 6, while it can be seen that the variety of notch characteristics (width, depth, spacing) within different signaling systems may result in more limited shifting ranges, it generally remains the case that a data rate may be maximized for a given bit error rate by determining the frequency offset that will align the first dominant null in one component path with a local maximum of the other component path. This frequency offset is referred to herein as the target frequency adjustment and may be determined through empirical observation, simulation and/or modeling, and/or calibration techniques. The empirical observation and simulation approaches may be carried out, for example, by stepping the frequency offset in either a simulated or physical system through a range and measuring the bit error rate (or data eye opening or other indication of signaling margin) that results when signaling is performed at a frequency that is above the frequency of the first dominant null. The frequency offset that yields the minimum bit error rate (or other indication of maximum signaling margin) may then be selected as the target frequency adjustment. In the case of an empirical determination, the frequency adjustment setting that yielded the target frequency adjustment may be specified for selection in production systems. In a simulated environment, the frequency offset that yields the minimum bit error rate (or other indication of maximum signaling margin) may be used directly to select the frequency response adjustment setting in systems having deterministic, known frequency shifts for different frequency-response adjustment settings, or as a starting point for dialing in the setting in a less deterministic system. In an analytical approach, an analytical model of the signaling system may be constructed to enable determination of the target frequency adjustment (similar to the simulation, but using, for example, closed analytical expressions of the signaling system), and the target frequency adjustment thereafter applied directly or indirectly (i.e., as a starting point for finer in-system determination) in the system frequency-response adjustment.

Figure 7B:
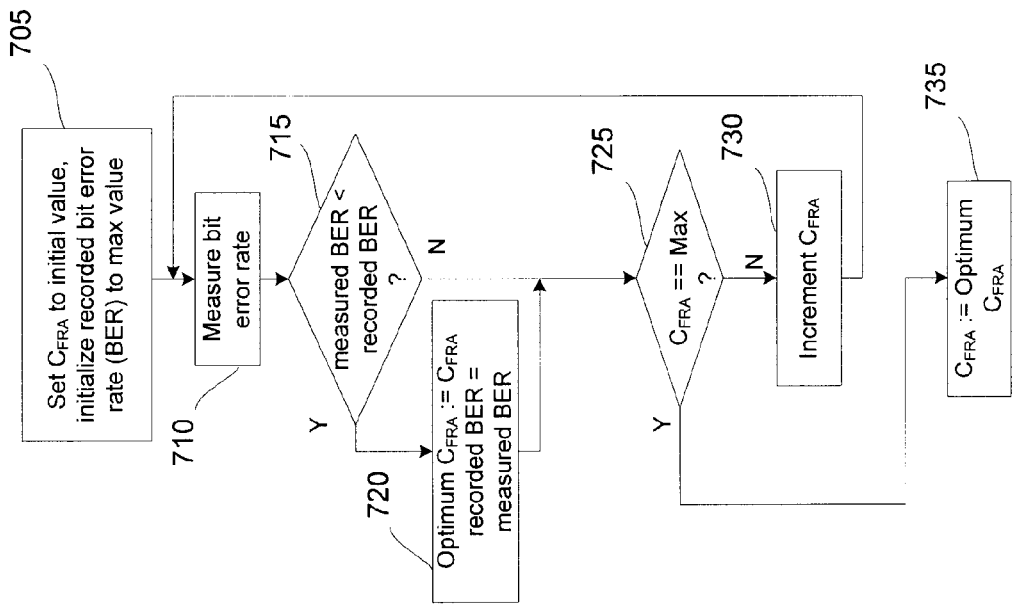
FIGS. 7A-7C illustrate an asymmetric differential signaling system having on-die circuitry to support run-time (or production-time) frequency-shift calibration, and an exemplary calibration operation relating to same.
Figure 7A:
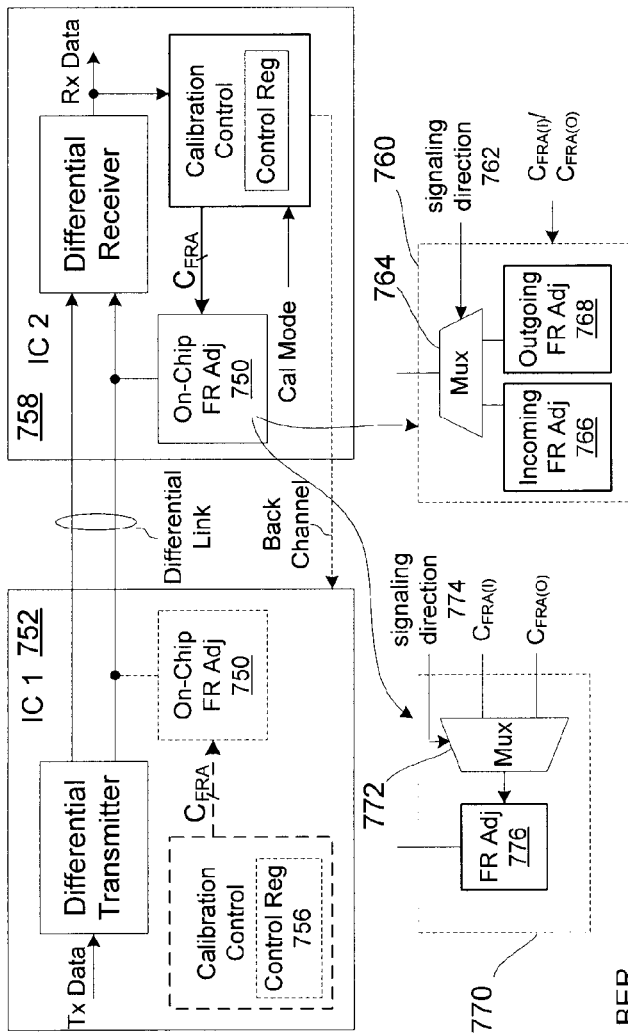
Figure 7C:
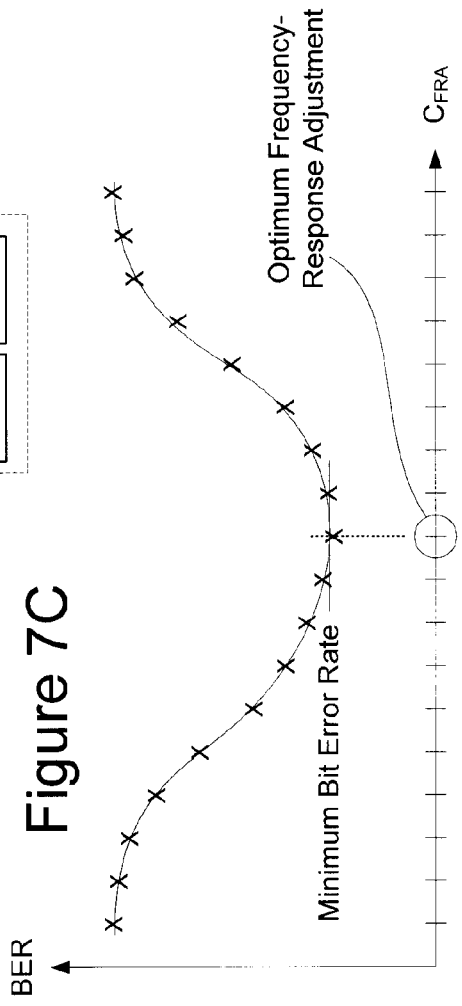

FIG. 7A illustrates an embodiment of an asymmetric differential signaling system having on-die circuitry to support run-time (or production-time) frequency-shift calibration. In the particular implementation shown, the differential receiver includes on-chip frequency adjustment circuitry that operates generally as described in reference to FIG. 4, as well as calibration control circuitry to generate the frequency-response adjustment control signal (CFRA). In one embodiment, the calibration control circuitry includes comparison circuitry that, when enabled in response to a cal-mode signal, compares the received data with a known data pattern to determine the presence and rate of bit errors and thus determine a bit error rate (although other measures of signaling margin may alternatively be determined, such as measures of data eye height, width). As shown in FIG. 7B, the calibration control circuit may step the CFRA signal through a full or limited range of settings and determine, by comparing the bit error rates for each setting, the frequency-response adjustment which yields the minimum bit error rate. More specifically, at 705, the CFRA may be set to an initial (e.g., minimum) value and a recorded bit error rate set to a maximum value. At 710, the bit error rate may be measured (e.g., through reception of a known data sequence and comparison with expected data). If the measured bit error rate is lower than the recorded bit error rate (decision block 715), the CFRA setting that yielded the lower bit error rate is recorded as the optimum CFRA and the measured bit error rate stored as the recorded bit error rate (the new minimum) in block 720. If the CFRA has not yet been stepped to the maximum CFRA value (determined in decision block 725), the $C_{FRA}$ value is incremented at 730, and the measurement, comparison and conditional-recordation operations at blocks 710-720 repeated. If the CFRA is determined to have reached the maximum CFRA value in block 725, the calibration operation may be deemed complete and the CFRA value recorded as the optimum CFRA may be applied to effect the desired frequency-response adjustment during run-time operation (after exiting calibration mode) as shown at 735. The frequency-response adjustment thus determined may be stored, for example, within a volatile or non-volatile control register (or other configuration circuit) and until the next calibration operation, if any, used to effect the desired frequency-response adjustment within on-chip frequency-response adjustment element 750. The effect of the overall calibration operation is illustrated graphically in FIG. 7C, with the steps of the $C_{FRA}$ value shown along the horizontal axis, and the bit error rate measurement along the vertical axis. The optimum CFRA value corresponds to the minimum detected bit error rate (and thus the optimum frequency response adjustment, within the resolution provided for by the system) as shown.

In the case of a run-time calibration operation, after initializing the frequency-response adjustment in a power-on calibration operation, the bit error rate may be evaluated from time to time during system operation and adjustment made to compensate for frequency-response drift due to changes in voltage and temperature (or any other environmental factors). Such periodic calibration operation may be triggered in response to determination of a threshold bit error rate (e.g., errors above a predetermined or programmed threshold), passage of a predetermined period of time (or count of clock edges or other events), calibration command from an off-chip source, or any other event or condition that indicates that such re-calibration may be desirable.

Considering the calibration operation of FIG. 7B, it should be noted that if a given system is known deterministically to exhibit a single minimum response (i.e., as opposed to multiple local minimums), the search for the control value that yields the lowest bit error rate may be truncated after detection of a new optimum control setting followed by a threshold number of control settings that produce increased bit error rates relative to the minimum. That is, once the minimum has been found, further measurement/comparison is unnecessary so that stepping through the remaining control settings may be omitted.

Although calibration operations have been described in the context of testing a signal quality metric for a sequence of frequency-response settings at a fixed operational frequency, an alternative approach is to iteratively sweep the signaling rate through a range of frequencies and to either measure or simulate the frequency response of a differential link in response to initial and subsequent values of frequency response adjustment and to select the degree of frequency response adjustment that yields an optimum, or at least an improved, frequency response of the differential link. More generally, any manner of assessing signaling performance as a function of frequency-response adjustment may be used to determine run-time, production-time or designed-in frequency-response adjustments to one or both components of an asymmetric differential signaling link.

Returning to FIG. 7A, it should be noted that on-die frequency-adjustment circuitry may alternatively or additionally be provided in the transmitting IC 752, as shown at 750. In that case, a back-channel may be provided to communicate frequency-response adjustment information from the receiving IC to the transmitting IC. As an example, the back-channel may be implemented through common-mode signaling on the differential link (thus enabling the frequency-response adjustment information to be communicated concurrently with primary-channel differential signaling over the link), and/or the differential signaling channel or another link used for operational communication between the ICs may be time-multiplexed between transmission of information relating to the primary function of the ICs (e.g., memory read/write commands and/or read/write data in a memory system, or similar command/response communications between other types of ICs) and communication of the frequency-response adjustment information. In yet other embodiments, a dedicated signaling path may be provided for communicating frequency-response adjustment information between the ICs (as well as other information such as equalization updates or any other information used to manage configuration and/or communication between the ICs). The frequency-response adjustment information may include, for example, one or more frequency-response adjustment values to be stored within a control register (756) or other configuration circuit of the transmitting IC, information indicating a relative change to a previously stored frequency-response-adjustment value (e.g., increment/decrement indication), and/or error information that would enable calibration of the frequency-response adjustment value within the transmitting IC using, for example, the approach described in reference to FIG. 4B.

Still referring to FIG. 7A, additional differential transmitter and differential receiver circuits may be provided within ICs 752 and 758, respectively, to enable the differential signaling link to be driven in a direction opposite that shown (i.e., to be driven by a transmitter in IC 752 to a receiver in IC 758). In such an embodiment, a single frequency-response adjustment element 750 (or set of elements 750) may be provided within either IC 752 or IC 758 and calibrated using any of the techniques disclosed herein. Alternatively, a distributed set of frequency-response adjustment elements may be provided (e.g., one or more elements 750 disposed on each IC die), with the distributed adjustment elements calibrated as a group (e.g., testing in either or both communication directions with all possible permutations of the CFRA settings, or any subset of the settings), or calibrated individually (e.g., finding optimal CFRA setting for one frequency-response adjustment element at a time, proceeding in any sequence from element to element).

In yet another embodiment, different frequency-adjustment settings may be applied for each transmission direction, thus providing direction-sensitive frequency-response adjustment to account for direction-dependent differences in the channel characteristics (e.g., direction-dependent output driver and/or sampler circuit characteristics). In the embodiment shown in detail view 760, for example, a signaling-direction signal 762 (indicating whether signals are incoming or outgoing on the signaling link at a given point in time) is supplied to multiplexer 764 or other selector circuit to dynamically select between incoming- and outgoing-frequency-response-adjustment elements (766 and 768, respectively), switchably coupling one element to the link and de-coupling the other (and vice-versa when the signaling link is turned around for signaling in the reverse direction). In the implementation shown, separate adjustment control signals, $C_{FRA(I)}$ and $C_{FRA(O)}$, are supplied to the incoming- and outgoing-frequency-response adjustment elements to enable them to be independently calibrated.

Still referring to FIG. 7A, instead of switchably coupling/de-coupling different direction-tuned frequency-response adjustment elements to the component signaling path, different control settings may be selectively applied to a single frequency-response adjustment element (or combination of adjustment elements) to effect direction-specific frequency-response tuning. One example of this arrangement is shown in detail view 770, and includes a multiplexer 772 to select one of two frequency-response adjustment settings, CFRA(I) or CFRA(O)) depending on the signaling direction (as indicated by signaling-direction signal 774), thus enabling dynamic, direction-sensitive switching between different control settings applied to frequency-response adjustment element 776.

Figure 8:
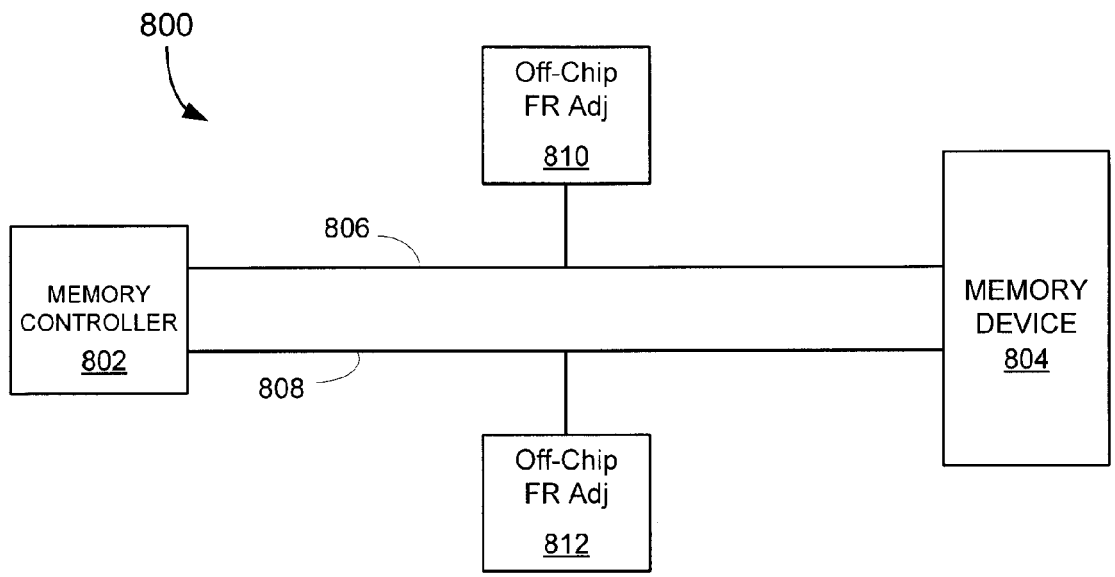
FIG. 8 illustrates an embodiment of a memory system utilizing an asymmetric differential signaling link.

FIG. 8 illustrates one embodiment of a memory system, generally designated 800, that employs one or more of the asymmetric differential signaling techniques described herein. The system includes a first integrated circuit in the form of a memory controller 802 having differential transmitter circuitry (not shown) to communicate in a point-to-point fashion with differential receiver circuitry (not shown) disposed on a memory device 804. Communication between the controller and the memory device is carried out via a differential channel comprising a first signal component line 806 and a second signal component line 808.

Further referring to FIG. 8, the memory system 800 employs respective frequency adjustment circuits 810 and 812 that may take one of several different static or dynamic circuit forms consistent with the various embodiments described herein. Similar to the previously described embodiments, the frequency response characteristics for each of the component signal lines are configured such that resulting individual component line notches are offset in frequency sufficient to enhance the combined differential frequency response notch. In memory system applications, the asymmetric differential channel may be utilized for differential data lines, differential timing reference lines, and/or differential control/address lines.

Figure 9:
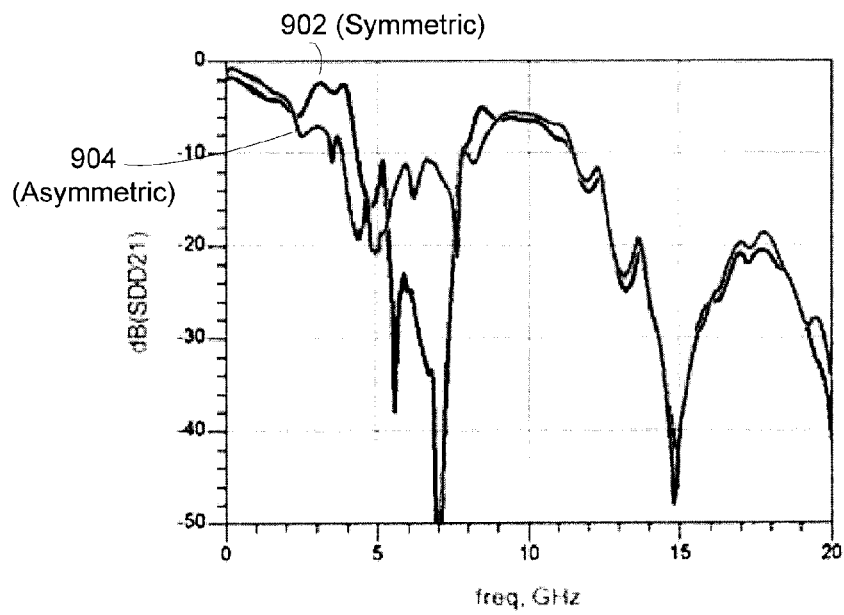
FIG. 9 graphically illustrates a comparison in frequency response characteristics for a memory system employing an asymmetric differential signaling link versus a symmetric differential signaling link.

In one specific embodiment, and referring now to FIG. 9, a differential channel length of approximately 2 inches may be employed with a channel capacitance Ci of about 1 picofarad. By offsetting the frequency response notches of the individual component signal lines (by approximately 2 GHz, in this specific example), a notch that would otherwise be present at approximately 7 GHz (the frequency response for a symmetric differential channel, at 902) may be pushed out to approximately 15 GHz (the frequency response for an asymmetric differential channel, at 904)—achieving more than twice the bandwidth of the original channel configuration.

V. Narrowband Resonance Mitigation in a Single-Ended Multi-Drop Signaling Link

Figure 10:
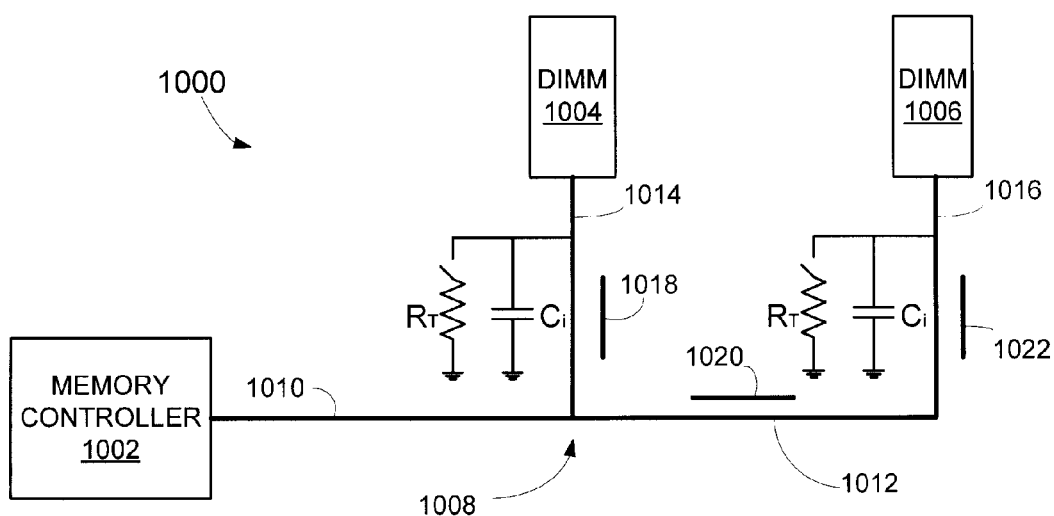
FIG. 10 illustrates an embodiment of a multi-DIMM memory system employing a single-ended resonance mitigation technique.

FIG. 10 illustrates a single-ended multi-drop signaling system in the form of a memory system, generally designated 1000. In contrast to a differential signal path, which employs two lines to transmit one symbol, a single-ended path employs a single line for symbol transmission. The system includes a first integrated circuit comprising a memory controller 1002 that communicates with two dual inline memory modules (DIMM) 1004 and 1006 via a multi-drop transmission line 1008. Each DIMM includes multiple integrated circuit chips in the form of memory devices (not shown) such as non-volatile (flash) or volatile (DRAM) devices.

Further referring to FIG. 10, the multi-drop transmission line 1008 may be routed along a multi-layer printed circuit board (not shown) and includes respective first and second segments 1010, 1012, and stubs 1014 and 1016. Each stub represents the connecting path linking a DIMM to the transmission line. Thus, the multiple DIMMs form multiple loads or "drops" along the line. Further, each stub connects with a selectively enabled termination resistor RT and experiences a parallel channel capacitance Ci. The segments and stubs provide signaling paths for signals during operation that, without resonant mitigation circuitry, involve resonant effects due to signal reflections (a signal component) from one path affecting a direct signal (another signal component) propagating on the other path. To minimize these resonant effects, one or more isolated frequency-selective coupling elements, such as 1018, 1020, and 1022 are disposed proximate one or more of the transmission line segments and stubs.

With continued reference to FIG. 10, the isolated coupling elements 1018, 1020 and 1022 may themselves comprise passive transmission line stubs or segments, but are disposed in such a way as to selectively couple with the system transmission line only during narrowband operations. In this way, any signal attenuation occurs over a narrow range of frequencies, rather than over a wide frequency band or range. Other embodiments may employ any of the passive circuit components relating to the differential signaling techniques described above to carry out the coupling. The amount of coupling and the frequency at which the coupling occurs are both functions of the coupled line geometry and can be straightforwardly determined for a given application. In some embodiments, both ends of one or more of the coupled elements may be shorted to ground or terminated to desired impedances. This provides a control mechanism to change the phase and/or magnitude of the signal transmitted through the main line 1008. The frequency where the maximum coupling occurs is a function of the length of the coupled line. The coupling coefficient, on the other hand, is a function of the spacing between the lines. If the lines are placed on two different PCB layers, the substrate thickness determines the spacing. In effect, the coupled lines behave as frequency-selective attenuators to reduce the effect of reflections in multi-drop implementations.

Figure 11:
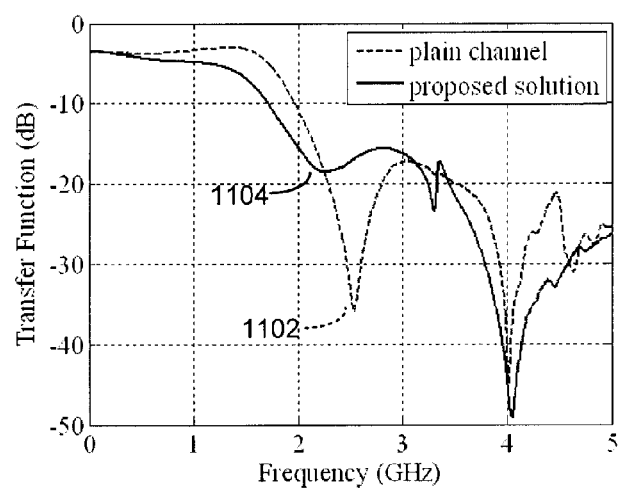
FIG. 11 graphically illustrates a comparison in frequency response characteristics for the memory system of FIG. 10 versus a memory system not employing the resonance mitigation technique described herein.

In one specific embodiment, a two-stub channel may be employed on a 4-layer standard PCB using FR4 material with a channel capacitance of approximately 1 picofarad. FIG. 11 illustrates the frequency response of the channel to the stub 1014 closest to the memory controller 1002 with and without the resonance mitigation technique described above. A frequency null, at 1102, corresponds to the resonance due to the difference in the path lengths between the direct path (the segment routed between the controller 1002 to the first stub 1014), and the reflected path (the path routed from the controller to the second stub 1016, and back to the first stub). With the direct path carrying the direct signal (a first signal component of the originally transmitted signal), the second path carries a reflected signal (a second component of the originally transmitted signal). By asymmetrically offsetting the first and second signal components such that the second component becomes significantly attenuated by the coupled transmission line elements, the resonance that would normally occur with the signal components may be significantly reduced, such as shown at 1104.

Further referring to FIG. 11, the depth of the null is reduced using the proposed coupling technique as the reflected signal is attenuated by five coupled lines (stubs 1014, 1016 and elements 1018, 1020, and 1022) versus one coupled line (the first stub) for the direct signal. Additionally, the location of the null is slightly offset to a lower frequency due to the increased line capacitance introduced by the coupled line, which increases the effective length of the line.

The resonance mitigation technique described above provides significant benefits for single-ended multi-drop signaling environments, and in some applications, may provide up to a 400% reduction in inter-symbol-interference (ISI) induced jitter in the received signal. Moreover, these benefits may be straightforwardly achieved by using passive coupling elements tuned to the channel during system manufacture or assembly.

VI. Computer-Readable Representations of Devices and Processes

The various analytical and simulation approaches described herein, to the extent realizable using a programmable computer, may be manifested as one or more sequences of machine-executable instructions and embodied in a computer-readable medium. The term "computer-readable medium" as used herein refers to any medium that can store information for a processor, including but not limited to, non-volatile media or volatile media. Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read.

In addition to the foregoing, any or all of the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and HLDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

VII. General Considerations

In the preceding description and in the accompanying drawings, specific terminology and drawing symbols are set forth to provide a thorough understanding of the present invention. In some instances, the terminology and symbols may imply specific details that are not required to practice the invention. For example, signaling systems depicted as having separate transmitters and receivers coupled by differential signaling links, may instead have pairs of transceivers coupled by differential signaling links. Similarly, each of the paired-conductor signal lines may alternatively be n-conductor signal lines, where n is an integer greater than two. Also, components identified as transmitters or receivers may be separate components or may be located on the same integrated circuit. Also, signals described or depicted as having active-high or active-low logic levels may have opposite logic levels in alternative embodiments. As another example, circuits described or depicted as including metal oxide semiconductor (MOS) transistors may alternatively be implemented using bipolar technology or any other technology in which a signal-controlled current flow may be achieved. Also signals referred to herein as clock signals may alternatively be strobe signals or other signals that provide event timing.

With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as connections through one or more intermediary circuits or structures. The term "exemplary" is used herein to express an example, not a preference or requirement.

With regard to terminology particular to data storage systems, the expression "dynamic random access memory" (DRAM) is used herein to mean any type of volatile random access memory that requires periodic refresh to avoid data loss and should not be construed as limited to a specific type of storage technology. Also, the expression "memory device" is generally used herein to refer to an integrated circuit die (or package containing same) having predominantly a data storage function, though a memory device may include additional circuitry on the same die or within the same package, for example, to perform a memory controller function or other control function. The term "memory" alone refers broadly to a memory system or memory device.

The section headings provided in this detailed description are for convenience of reference only, and in no way define, limit, construe or describe the scope or extent of such sections. Also, while the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof Accordingly, the specification and drawings are to be regarded in an illustrative rather than a restrictive sense.

What is claimed is:

1. A method of conveying information over a differential signaling link formed by first and second component signal paths, the method comprising:
   offsetting a notch in the frequency response of the first component signal path from a notch in the frequency response of the second component signal path; and
   transmitting a signal over the differential signaling link at a signaling rate that exceeds the center frequencies of the notches in the first and second component signal paths.

2. The method of claim 1 wherein offsetting the notch in the frequency response of the first component signal path from the notch in the frequency response of the second component signal path comprises adjusting an electrical characteristic of the first component signal path to offset the center frequency of the notch in the frequency response of the first component signal path relative to the center frequency of the notch in the frequency response of the second component signal path.

3. The method of claim 2 wherein adjusting an electrical characteristic of the first component signal path to offset the center frequency of the notch in the frequency response of the first component signal path relative to the center frequency of the notch in the frequency response of the second component signal path comprises shifting the center frequency of the notch in the frequency response of the first component signal path to a lower frequency by a frequency-offset sufficient to avoid spectral overlap between the notches in the frequency responses of the first and second component signal paths.

4. The method of claim 3 wherein shifting the center frequency of the notch in the frequency response of the first component signaling path by a frequency-offset sufficient to avoid spectral overlap comprises shifting by a frequency-offset at least large enough to avoid overlap between a first frequency interval, defined by the frequency range between upper and lower cutoff frequencies of the notch in the frequency response of the first component signal path, and a second frequency interval, defined by the frequency range between upper and lower cutoff frequencies of the notch in the frequency response of the second component signal path.

5. The method of claim 1 wherein the first and second component signal paths include first and second signal path segments, respectively, that extend from respective signaling circuits of an integrated circuit (IC) device to an external interface of the IC device.

6. The method of claim 5 wherein the IC device comprises an IC die disposed within an IC package, wherein the signaling circuits are disposed on the IC die and the external interface comprises interconnect structures of the IC package.

7. The method of claim 5 wherein the IC device comprises an IC die, and wherein the signaling circuits and the external interface are disposed on the IC die.

8. The method of claim 5 wherein the respective signaling circuits comprise first and second receiver circuits coupled to the first and second signal path segments, respectively.

9. The method of claim 5 wherein the respective signaling circuits comprise first and second transmitter circuits coupled to the first and second signal path segments, respectively.

10. The method of claim 5 wherein the IC device comprises a first frequency-response adjustment element and a first switching element coupled between the first frequency-response adjustment element and the first signal path segment, and wherein offsetting a notch comprises switchably coupling the first frequency-response adjustment element to the first signal path segment via the first switching element.

11. The method of claim 10 wherein the IC device comprises a programmable register coupled to the first switching element and wherein switchably coupling the first frequency-response adjustment element to the first component signal path via the first switching element comprises storing within the programmable register a control value that sets the first switching element to a conducting state.

12. The method of claim 10 wherein the first frequency-response adjustment element comprises a stub that is switchably coupled to the first component signal path via the first switching element.

13. The method of claim 10 wherein the first frequency-response adjustment element comprises a reactive element that is switchably coupled to the first component signal path via the first switching element.

14. The method of claim 10 wherein the IC device further comprises a plurality of additional frequency-response adjustment elements, a plurality of additional switching elements and a programmable register to store a control value having constituent bits that control respective ones of the switching elements, including the first switching element, to enable each of the frequency-response adjustment elements, including the first frequency-response adjustment element, to be switchably coupled, via a respective one of the switching elements, to the first component signal path according to the state of the corresponding bit of the control value.

15. The method of claim 1 wherein offsetting the notch in the frequency response of the first component signal path from the notch in the frequency response of the second component signal path comprises selectively coupling frequency-response adjustment elements to the first component signal path via respective switching elements.

16. The method of claim 15 wherein the frequency-response adjustment elements comprise at least one of a stub or a reactive element.

17. The method of claim 15 wherein the switching elements comprise transistor switches and wherein selectively coupling frequency-response adjustment elements to the first component signal path via respective switching elements comprises selectively switching the transistor switches to a conductive state.

18. The method of claim 15 wherein the switching elements comprise selectively formed hardwired interconnections.

19. An integrated circuit (IC) device comprising:
first and second interconnection structures to couple to first and second external signaling lines, respectively; and
first and second internal signaling lines coupled respectively to the first and second interconnection structures and to form, together with the first and second external signaling lines, at least a portion of a differential signaling link having first and second component signal paths, the first component signal path being formed at least in part by the first internal signaling line and the first external signal line, and the second component signal path being formed at least in part by the second internal signaling line and the second external signaling line; and
a frequency-response adjustment element switchably coupled to the first internal signaling line to enable a notch in the frequency response of the first component signal path to be offset from a notch in the frequency response of the second component signal path.

20. The IC device of claim 19 further comprising:
a switching element coupled between the first internal signaling line and the frequency-response adjustment element; and
a register coupled to the switching element to set the switching element to either a conducting state or a non-conducting state according to a value stored within the register.

21. The IC device of claim 19 further comprising a transmitting circuit coupled to the first and second internal signaling lines to output a differential signal onto the differential signaling link.

22. The IC device of claim 21 wherein the frequency-response adjustment element is a component of the transmitting circuit.

23. The IC device of claim 19 further comprising a receiving circuit coupled to the first and second internal signaling lines to receive a differential signal via the differential signaling link.

24. The IC device of claim 19 further comprising an IC package and an IC die disposed within the IC package, wherein the first and second interconnection structures are disposed at a periphery of the IC package and the first and second internal signal paths extend from the IC die to the first and second interconnection structures.

25. The IC device of claim 24 wherein the frequency-response adjustment element is disposed on the IC die.

26. The IC device of claim 19 further comprising an IC die on which and second interconnection structures, the first and second internal signal paths and the frequency-response adjustment element are formed.

27. A signaling system comprising:
a differential transmitter;
a differential receiver;
a differential signaling link coupled between the differential transmitter and differential receiver and formed by first and second signaling paths; and
a frequency-response adjustment element coupled to the first signaling path of the differential signaling link to offset a notch in the frequency response of the first signaling path from a notch in the frequency response of the second signaling path.

28. The signaling system of claim 27 further comprising:
a first integrated circuit die having the differential transmitter formed thereon; and
a second integrated-circuit die having the differential receiver disposed thereon.

29. The signaling system of claim 28 wherein at least one of the first integrated circuit die and the second integrated circuit die comprises a register to store one of a plurality of possible control values that correspond to respective offsets between the notches in the frequency responses of the first and second signaling paths, the register to output a control signal to the frequency-response adjustment element in accordance with the one of the plurality of possible control values.

30. An apparatus for conveying information over a differential signaling link formed by first and second component signal paths, the apparatus comprising:
   means for offsetting a notch in the frequency response of the first component signal path from a notch in the frequency response of the second component signal path; and
   means for transmitting a signal over the differential signaling link at a signaling rate that exceeds the center frequencies of the notches in the first and second component signal paths.

31. A method of conveying information over a differential signaling link formed by first and second component signal paths, the method comprising:
   transmitting a first signal component over the first component signal path, the first signal path having a first frequency response exhibiting a first notch with a first center frequency;
   transmitting a second signal component over the second component signal path, the second signal path having a second frequency response exhibiting a second notch with a second center frequency;
   wherein the first and second signal components cooperate to form a differential signal, and the first and second center frequencies are offset in frequency by a predetermined value.

32. The method according to claim 31 wherein the first signal component frequency response includes a local peak value and the second signal component frequency response includes a local minimum value, and wherein the predetermined value is based at least in part on aligning the respective frequency responses of the first and second signal component paths such that the local peak value substantially aligns with the local minimum value.

33. The method according to claim 31 wherein the frequency response of one of the first and second signal component paths includes a notch minimum value and the frequency response of the other of the first and second signal components includes a cutoff frequency attenuation value, wherein the predetermined value is based at least in part on aligning the respective frequency responses of the first and second signal component paths such that the notch minimum value is less than the cutoff frequency attenuation value.

34. The method according to claim 31 wherein each of the first and second notches include a low-frequency cutoff attenuation value and a high-frequency cutoff attenuation value, and wherein the predetermined value is based at least in part on aligning the respective frequency responses of the first and second signal component paths such that the low-frequency cutoff attenuation value of one of the first and second notches substantially aligns with the high-frequency cutoff attenuation value of the other of the first and second notches.

35. The method according to claim 31 wherein each of the frequency responses of the first and second signal component paths exhibit primary and secondary notches, the primary and secondary notches being displaced in frequency by a displacement range, and wherein the predetermined value is based at least in part on aligning the respective frequency responses of the first and second signal component paths such that the first notch is offset from the second notch by no more than the displacement range.

36. The method according to claim 35 wherein the predetermined value is based at least in part on aligning the respective frequency responses of the first and second signal component paths such that the first notch is offset from the second notch by no more than half the displacement range.

37. The method according to claim 31 wherein the frequency response of one of the first and second signal component paths includes a notch minimum attenuation value and the frequency response of the other of the first and second signal components includes a receiver sensitivity value, wherein the predetermined value is based at least in part on aligning the respective frequency responses of the first and second signal component paths such that the notch minimum attenuation value has a lower value than the receiver sensitivity value.

38. The method according to claim 31 wherein each of the first and second notches include a low-frequency receiver sensitivity value and a high-frequency receiver sensitivity value, and wherein the predetermined value is based at least in part on aligning the respective frequency responses of the first and second signal component paths such that the low-frequency receiver sensitivity value of one of the first and second notches substantially aligns with the high-frequency receiver sensitivity value of the other of the first and second notches.

39. A method of conveying information over a signaling link formed by first and second component signal paths, the first and second component signal paths having respective frequency response characteristics, the method comprising:
   transmitting a first signal component over the first component signal path, and a second signal component over the second component signal path;
   asymmetrically offsetting the frequency response characteristics associated with the first and second signal component paths by a predetermined value through use of passive circuitry to mitigate a resonance condition associated with the first and second signal components.

40. The method according to claim 39 wherein the first and second signal component paths cooperate to form a differential link, and asymmetrically offsetting the frequency response characteristics includes:
   offsetting a first frequency response characteristic of the first signal path with respect to a second frequency response characteristic of the second signal path such that respective first and second notches associated with the first and second frequency response characteristics are offset in frequency by the predetermined value.

41. The method according to claim 39 wherein the first and second signal component paths cooperate to form a single-ended multi-drop signaling link, and asymmetrically offsetting the frequency response characteristics includes:
   attenuating the second signal component by coupling at least one frequency-selective attenuator to one or both of the first and second signal component paths.

42. A non-transitory computer-readable media having information embodied therein that includes a description of an integrated-circuit (IC) memory device, the information including descriptions of:
   first and second interconnection structures to couple to first and second external signaling lines, respectively; and
   first and second internal signaling lines coupled respectively to the first and second interconnection structures and to form, together with the first and second external signaling lines, at least a portion of a differential signaling link having first and second component signal paths, the first component signal path being formed at least in part by the first internal signaling line and the first external signal line, and the second component signal path being formed at least in part by the second internal signaling line and the second external signal line; and
   a frequency-response adjustment element switchably coupled to the first internal signaling line to enable a notch in the frequency response of the first component signal path to be offset from a notch in the frequency response of the second component signal path.

* * * * *